United States Patent [19] [11] Patent Number: 4,663,381
Blümel et al. [45] Date of Patent: May 5, 1987

[54] INTERIOR NOISE REDUCTION IN MOTOR VEHICLES

[75] Inventors: Ehrenfried Blümel, Adelheidsdorf; Heinemann Gahlau, Celle; Manfred Hoffmann, Nienhof; Klaus Wittenmayer, Uetze; Thomas Stankiewicz, Celle; Christoph Kittel, Nienhagen, all of Fed. Rep. of Germany

[73] Assignee: Dr. Alois Stankiewicz GmbH, Adelheidsdorf, Fed. Rep. of Germany

[21] Appl. No.: 675,407

[22] Filed: Nov. 27, 1984

[30] Foreign Application Priority Data

Nov. 30, 1983 [DE] Fed. Rep. of Germany ....... 3343402
Mar. 14, 1984 [DE] Fed. Rep. of Germany ....... 3409404

[51] Int. Cl.$^4$ ............................................. C08K 3/26
[52] U.S. Cl. ................................... 524/426; 524/425; 524/427; 524/525
[58] Field of Search ................ 524/425, 426, 427, 525

[56] References Cited

U.S. PATENT DOCUMENTS 4,210,188 7/1980 Banchieri ........................... 152/525
4,337,192 6/1982 Campbell ........................... 525/444
4,357,439 11/1982 Blumel et al. ...................... 525/239
4,408,006 10/1983 Milkovich et al. ................. 524/534

OTHER PUBLICATIONS

German Standard DIN 53 440, "Bending Vibration Test", p. 2, Apr. 1973.
Betzhold, Chr. and Gahlau, H., "On the Physico-acoustical Behavior of Visoelastic System: Damping Behavior of Materials and Components", Coloquim TU Berlin, 13, 14, Oct., 1975.

Primary Examiner—Herbert J. Lilling
Attorney, Agent, or Firm—Lewis H. Eslinger

[57] ABSTRACT

Viscoelastic plastics materials having a dynamic elasticity modulus of $10^7$ to $10^{10}$ $Nm^{-2}$ and a loss factor of at least 5 are used for the manufacture of motor vehicle parts, such as wheel housing parts, instrument panels, and door panels, in order to reduce interior noise.

4 Claims, 6 Drawing Figures

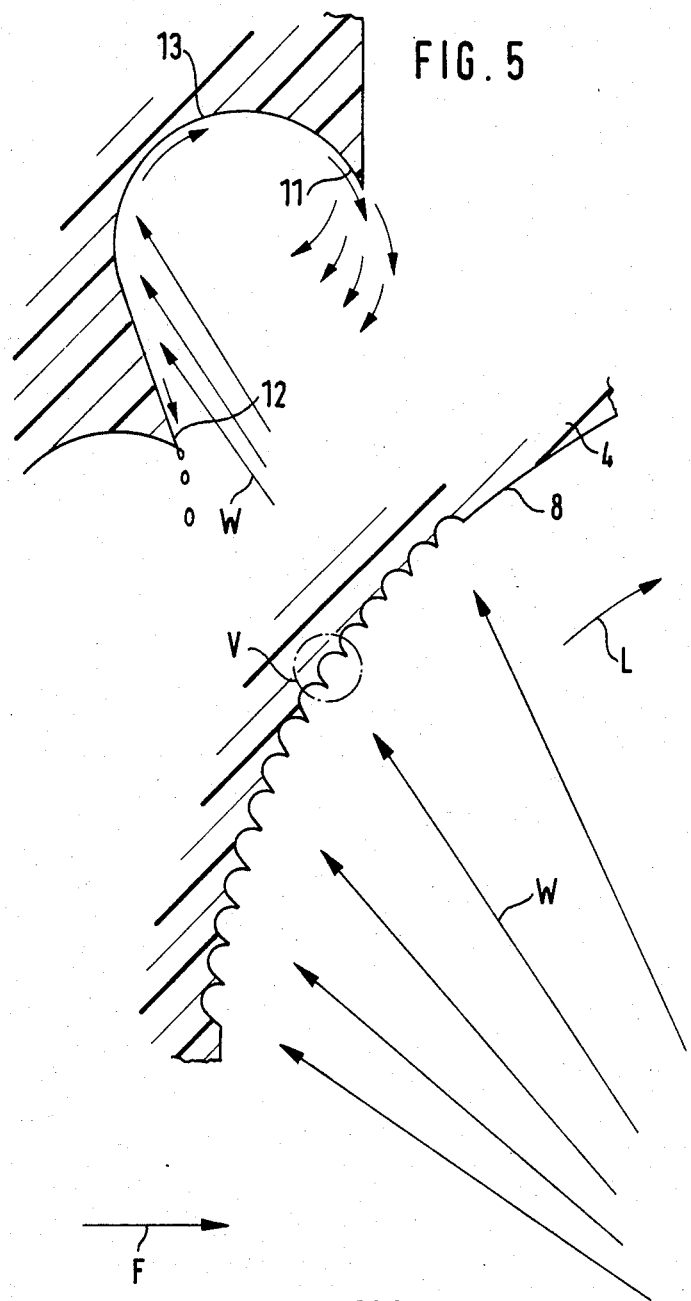

INTERIOR NOISE REDUCTION IN MOTOR VEHICLES

BACKGROUND OF THE INVENTION

This invention relates to the reduction of interior noise in motor vehicles.

It is known to secure a wheel housing part inside the wheel guard of a motor vehicle, preferably on the outwardly-facing flange area of the wheel guard, to provide protection against corrosion and gravel (see DE-OS No. 3149068). Hitherto, interior noise has not normally been a consideration when using conventional wheel housing parts. However, the reduction of interior noises in motor vehicles, in particular when travelling on a rain-soaked road, has become increasingly important. When travelling on rain-soaked roads, a distribution of the water round the rotating wheel is observed and, as a consequence, part of this water having the greatest impact energy, seen in the travel direction, strikes the rear section of the wheel housing part. It is at this precise point that there occurs the clearest transmission of the resultant noise to the inner area of the motor vehicle.

In contrast to this, one aim of the present invention is to provide a wheel housing part which, apart from providing protection against gravel and corrosion, also causes a noticeable reduction in the interior noise, especially when travelling on wet roads.

BRIEF SUMMARY OF THE INVENTION

According to one aspect of the present invention, there is provided a wheel housing part for securing inside a wheel guard of a motor vehicle, said part being formed from a viscoelastic plastics material having a dynamic elasticity modulus of $10^7$ to $10^{10}$ Nm$^{-2}$ and a loss factor of at least 0.05.

The noise reduction of wheel housing parts formed of plastics* by specially shaping and designing that surface of the wheel housing part which faces the wheel so that it has recesses at least in a portion thereof.
*materials can also be improved Because of the special plastics material used, impact force is dissipated by inner damping and hence the level of the interior noise of the vehicle is reduced. The use of hard, non-viscoelastic plastics material with a relatively high elasticity modulus and low damping, on the other hand, results in the occurrence of a relatively high secondary air-transmitted sound caused by the stimulus of the solid-conducted sound. For definitions of the terms "damping", "loss factor" and "elasticity modulus", attention is drawn, by way of example, to Gahlau, H., "Mechanisms and Possibilities of Solid-conducted Sound Damping - the New Direction Scheme VDI" reports No. 389, VDI Publishers GmbH, Dusseldorf, 1981. From picture 8 of this publication in particular there can be seen the special connection between the loss factor and the complex elasticity modulus.

The plastics materials to be used for the wheel housing part of the invention, have a dynamic elasticity modulus of $10^7$ to $10^{10}$ Nm$^{-2}$, in particular up to $10^9$ Nm$^{-2}$, and a loss factor of at least 0.05, in particular at least 0.07, and have to be specially produced by mixing together several components since, with conventional single component plastics material, these two conditions are not fulfilled simultaneously.

In accordance with one embodiment, it is possible to produce a plastics material suitable for the wheel housing parts of the invention, and which fulfills all the necessary requirements, by forming an intimate mixture of:

from 25 to 40% by weight of an olefin polymer and/or a styrene polymer with high impact resistance,
from 25 to 40% by weight of a synthetic rubber, in particular EPDM or SBR rubber, and
from 25 to 40% by weight of an amorphous filler.

Preferably the three components are present in the mixture in equal weight amounts, i.e. in amounts of respectively 33.3% by weight.

In addition the mixture may also include, based on 100% of the above three components, from 6.8 to 10.0% by weight of additives. These additives may be, for example, from 0.00 to 1.0%, in particular up to 0.25%, by weight of a colouring material, preferably carbon black; up to 7.0% by weight of a processing oil, preferably a naphthenic processing oil; from 0.8 to 1.2% by weight of a conventional stabiliser against thermal oxidation; and from 1.0 to 1.6% by weight of a lubricant, preferably a polyethylene wax.

An impact resistant polypropylene is particularly suitable as the olefin polymer having high impact resistance. As regards impact-resistant polypropylenes of this type, the expert has a choice of different suitable commercial products whose characteristic is that they do not break in impact tests.

The synthetic rubber used in this case as the second component is preferably a so-called EPDM rubber which is a terpolymer of ethylene, propylene and a diene. Suitable EPDM rubbers of this type are e.g. the commercially available products with the trade names Buna AP 437 and Vistalon 719. (The words "Buna" and "Vistalon" are Trade Marks). In a terpolymer of this type the unsaturated areas lie outside the main chain of the polymer so that the high stability of the polyolefins is retained and at the same time there is cross-linkability.

The filler used as the third component is an amorphous filler. Amorphous silicon dioxide and especially preferred amorphous chalk (amorphous $CaCO_3$) can be mentioned as filler materials of this type. It is well known to add chalk as a filler material to plastics mixtures to increase the density. However, hitherto the chalk used has been in crystalline form and it can be shown that, in the case of vibration stresses, the mechanical long term stability of the material is disadvantageously influenced by crystalline chalk of this type. The sharp edged crystals cause the formation of micro tears and mechanical damage to the polymer which in the long term become material fractures. The use of amorphous chalk, as in the present invention, avoids these disadvantages, and a plastics material having an excellent long term stability can be obtained.

Instead of the above described plastics mixture (polyblend) based on polypropylene/EPDM rubber, a suitable material can also be obtained from an appropriate mixture which, instead of the polypropylene contains polystyrene or a styrene copolymer having a high impact resistance, and instead of the EPDM rubber contains a styrene-butadiene-rubber (SBR or PBS).

A suitable polystyrene or styrene copolymer can be selected easily, according to the criteria given above for polypropylene, from the commercial products available.

In order to be able to process a mixture of the above constituents in the injection moulding process, the mixture preferably includes additives like a processing oil and a lubricant in the above-mentioned amounts. The processing oil, which in a mixture of a polypropylene and EPDM is preferably a naphthenic oil, is of great importance for the production of a homogenous, intimate mixture of the constituents as is necessary for injection moulding. The lubricant, preferably a polyethylene wax, is also present to simplify the processing in the injection moulding process.

Carbon black can be present as a further additive as a colouring material, whilst a conventional stabiliser is always added in practice to stabilise the polypropylene and EPDM against thermal oxidation and guarantee the long term stability of the finished moulded part. The following commercial products can be listed, by way of example, as conventional stabilisers of this type:

Hostanox 03, Cyanox 1790, Goodrite 3114, Topanol CA or Irganox 10-10.

A viscoelastic plastic can be produced, for example, with the necessary properties, by conventional mixing of the following constituents:

| Basic Mixture | |
|---|---|
| Polypropylene having high impact resistance | 350 parts |
| | 33.3% by weight |
| EPDM (Buna AP 437) | 350 parts |
| | 33.3% by weight |
| amorphous chalk | 350 parts |
| | 33.3% by weight |
| Additives | |
| carbon black | 1.8 parts |
| | 0.17% by weight* |
| naphthenic processing oil | 63 parts |
| | 6.00% by weight* |
| stabiliser against thermal oxidation | 10.5 parts |
| | 1.01% by weight* |
| polyethylene wax | 13.7 parts |
| | 1.30% by weight* |

The % by weight marked with * are based on 100% by weight of the basic mixture.

A plastics mixture of this type has the necessary physical properties for the desired noise reduction and can be processed by the injection moulding process to form the wheel housing parts according to the present invention.

Other suitable plastics materials can be mentioned which can be used according to the invention for the production of the wheel housing parts if they have a filler content of from 25 to 40% by weight. Although these other plastics materials are more expensive than those previously mentioned, special conditions and/or special technical requirements may justify their use in spite of higher costs.

These other plastics materials are in particular polyurethane-elastomers, thermoplastic polyamide-elastomers, elastomer-modified polyamides or thermoplastic polyesters having the characteristics of elastomers.

The polyurethane-elastomers can be thermoplastic polyurethane elastomers e.g. the products which are known commercially under the trade names Desmopan, Elastolan or Caprolan. Polyether-block-amides may be mentioned as examples of thermoplastic polyamide elastomers, for example the products sold under the trade name Pebax. In addition polymer blends of polyamides and elastomers are also suitable. Polyetheresters, for example polyether terephthalates, are suitable as thermoplastic polyesters having an elastomer character, such as those known commercially under trade names Arnitel or even Hytrel. (The words "Desmopan", "Elastolan", "Caprolan", "Pebax", "Arnitel", and "Hytrel" are Trade Names).

Even the plastics materials listed immediately above normally contain the above-mentioned additives, like a colouring material and/or carbon black and/or a processing oil and/or a conventional stabiliser and/or a lubricant. In addition, in the case of these plastics materials, plasticisers can be added instead of the processing oils.

Known duroplastic PUR-two-component materials can also be used as the polyurethane elastomer if the loss factor can be brought into the predetermined order of magnitude by using a suitable plastics mixture and suitably selecting the amount of filler. Two-component elastomers with a polyurethane base are suitable, for example. However, other elastomers based on synthetic rubbers can also be used. The end products can be produced by hot- or cold-hardening and also by vulcanisation. The RIM process is an advantageous form of production.

In the case of two-component-PUR-materials, the first component comprises a polyol and/or a polyol mixture, if necessary mixed with a polyoxyalkylene polyamide (Jeffamine), wherein the OH number of the polyol or of the polyol mixture should be between 150 and 350. Polyols based on polyethers or polyesters, or polyol-mixtures, can be used as the polyols and these contain additives of short-chained aliphatic diols or triols, for example butane 1,4-diol, dipropylene-glycol, diethylene glycol or glycerin. Apart from the polyol the first component contains the mineral filler or a mixture of mineral filler materials, for example heavy spar, chalk, powdered slate or talc. These filler materials are preferably amorphous. The first component further contains, if necessary, a water-extracting agent, e.g. the commercial product Bylith-Paste T, and also conventional activators, namely organic tin salts e.g. dibutyl tin laurate (DBZL) and/or amines, e.g. triethylene diamine (DABCO). If need be the products can also be obtained in the form of micro cellular foams (densities preferably over 900 kg/m$^2$) by adding small amounts of foaming agents.

The second component contains, as a reaction partner for the polyol, a conventional isocyanate, preferably diphenyl-methane-4,4'-diisocyanate (MDI), e.g. in the form of the commercial product Desmodur 44V20, or toluol diisocyanate, for example the commercial product T80 or mixtures of isocyanates of this type, or even appropriate MDI- or TDI prepolymers. ("Desmodur" and "T80" are Trade Marks)

The two-component materials are preferably produced by the RIM process.

In regard to the preferred shape and design of the wheel housing part as described above, this was arrived at after a consideration of the water distribution occurring during travel of the vehicle on wet roads since it has been found that this has a special influence on the origin of interior noises. Since that part of the water having the greatest impact force, strikes the rear section of the wheel housing part (with reference to the travel direction), and, to a lesser extent, in that portion of the wheel housing part which extends from that section in the direction of rotation right up to a location opposite the point of contact of the wheel with the road, at least said section and optionally said portion are provided with the recesses which preferably are spherical segment shaped. Thus the greatest effect is achieved by specially shaping the wheel housing in these areas. The water is collected in the recesses and then immediately after wards is finely swirled by the air flow. Furthermore the water collected therein forms a damping film which increases the acoustic impedance. An increase in impedance is also achieved when the wheel housing part has a surface, preferably a surface which is remote from the wheel, which is surface-thickened in the region of the projected contact surface of the wheel. This is particularly the case where the surface-thickening is present in the zones of highest impact energy, namely in the rear section as seen in the direction of travel of the vehicle. Preferably the material thickness tapers continuously from the rear end of the wheel housing part up to the middle section of the wheel housing part opposite the wheel contact point. By tapering the wall thicknesses at the lateral edges, and by resiliently coupling the wheel housing part to the wheel guard or its flange area, a spring effect is achieved which also has an energy-consuming effect.

The rotating air flow swirls the water collected in the recesses in such a way that water drops can hardly add to the stimulus of the solid-conducted sound of the wheel housing part since only small amounts of water appear on the surface. For swirling the water it is advisable if the forward ends of the recesses (reference being made to the direction of travel) have raised edges so as to produce a turbulence flow. On the other hand, in order to guarantee a speedy drainage of water when the vehicle is standing still, the rearward ends of the recesses (reference being made to the direction of travel), are designed to be flush with the adjacent surface of the wheel housing part. So as to further encourage the swirling of water, the entire surface of the wheel housing part facing the projected contact surface of the wheel is roughened, preferably artificially. The small depressions thus obtained contribute to maintaining a film of water on the surface of the moulded wheel housing part.

A further factor in the conventional use of plastics wheel housing parts to prevent the effects of gravel and to avoid damage by corrosion that has not been taken into consideration hitherto is the clearance between the wheel guard and the wheel housing part. In particular acoustic criteria have not been taken into account here.

From Bergmann, M., "Noise occurrence during travel on wet surfaces", dissertation: Technical University Berlin, 1979, in particular diagrams 32, 33 and 34, it is known that the rolling sounds on a wet road are characterised by parts having a particularly high frequency and also by parts having a very low frequency, such as occur also when travelling on a dry road. Taking into account these facts, a further reduction in the interior noise in motor vehicles can be achieved by ensuring that the surface mass and the clearance of the plastics wheel housing part with respect to the wheel guard are so dimensioned that there is absorption of the lower frequencies by the formation of a cavity resonator. By providing a surface mass for the plastic wheel housing part of about 2.5 kg m$^2$ and a clearance of about 20 mm at the most with respect to the wheel guard, the resultant cavity resonator absorbs vibration at a frequency below 300 Hz. The surface mass of the wheel housing part that is already present, and the special shaping of the wheel housing part as above described, are used to reduce the high frequency parts, preferably in the range above 1000 Hz, since high frequencies of this type (corresponding to small wave lengths) are reflected.

The wheel housing parts may be made by, for example, an injection moulding process or deep drawing.

In accordance with another aspect of the present invention, the plastics materials having the aforementioned necessry viscoelastic values and the advantageous mechanical-acoustic properties and which were developed for the wheel housing parts, are used in the production of vehicle interior panelling parts. Examples of interior panelling of this type are, in particular, instrument panels, wheel housing parts disposed inside the vehicle, and door panelling. The constructions of internal parts of this type from the materials disclosed in this application leads to an improvement in the acoustic quality of these parts.

Normally hard elastic plastics are used for interior panelling parts of this kind, e.g. ABS (acrylonitrile-butadiene-styrene) and polycarbonates. These products are particularly good because of their very high degree of shape stability but at the same time they have an unfavourable sound-reduction behaviour which is reflected in a low loss factor. The corresponding connection between the sound reduction behaviour and the loss factor can be seen for example from equation 3.19 on page 90 in Kurtze, G., Schmidt. H., Westphal, W.: Physics and Technology in Noise Abatement, Verlag G. Braun, Karlsruhe, 1975 or Dr. Alois Stankiewicz GmbH Information No. 122. From the equation it can be seen that the loss factor d (there designated $\eta$) is the essential parameter for the efficiency of the sound reduction. Moreover, the known conventional materials tend to produce crackling and rattling sounds in vehicle interior panelling because of their low loss factor, and these frequently have to be reduced by additional damping with the aid of solid-transmitted sound damping plastics coatings. The loss factor for the currently conventional and widely used ABS was determined, for example, dependent on the temperature, at from 0.01 up to 0.05 at the most.

When the special plastics materials having the desired viscoelastic values and developed for wheel housing parts are used for vehicle interiors, then disadvantageous effects on the acoustic behaviour are avoided whilst, because of the practically unchanging high elasticity modulus, the shape-stability obtained using conventional materials is obtained.

Plastics material having a dynamic elasticity modulus of $10^7$ to $10^{10}$ Nm$^2$ and a loss factor of at least 0.05, i.e. in particular plastics materials as were developed according to this invention for wheel housing parts, can be advantageously used anywhere where special value is placed on favourable noise abatement behaviour and thereby even air-transmitted sound radiation, encouraged by solid-transmitted sound, can be avoided due to the high loss factor of the materials. The parts produced from plastics materials of this type can, of course, also be provided with decorative effects by conventional processes.

The invention will be explained below in more detail by way of examples which disclose the use of plastics materials having the required viscoelastic properties.

EXAMPLE 1

A suitable plastics material based on a thermoplastic polyurethane-elastomer was prepared as follows:

| | |
|---|---|
| Thermoplastic polyurethane elastomer (Desmopan 385) | 61.7% |
| Diethylene glycol | 1% |

-continued

| | |
|---|---|
| Amorphous chalk | 35% |
| Carbon black | 1.5% |
| Lubricant | 0.8% |

A mixture of this kind could contain up to 5% of stabilisers or other additives like flame-retardant agents in the case of special requirements.

The material was viscoelastic and had a dynamic elasticity modulus of from $10^7$ to $10^{10}$ Nm$^{-2}$ and a loss factor of at least 0.05. A vehicle having wheel housing parts formed from the material had reduced interior noise.

In the case where the material is to be used for interior parts, the carbon black will advantageoulsy be electrically-conductive carbon black.

EXAMPLE 2

A plastics material based on a thermoplastic polyamide elastomer was prepared as follows:

| | |
|---|---|
| Polyether-block-polyamide (Pebax 5512) MN | 67% |
| Benzol sulphonic acid-n-butyl amide (Betamoll BMB) | 1% |
| Amorphous chalk | 30% |
| Carbon black | 1.5% |
| Lubricant | 0.5% |

In addition the additives mentioned in Example 1 could be incorporated.

The material was viscoelastic and had a dynamic elasticity modulus of from $10^7$ to $10^{10}$ Nm$^{-2}$ and a loss factor of at least 0.05. A vehicle having wheel housing parts formed from the material had reduced interior noise.

EXAMPLE 3

A plastics material based on a thermoplastic polyester was prepared as follows:

| | |
|---|---|
| Polyether ester (Arnitel EL 740) | 62.0% |
| Amorphous chalk | 36% |
| Carbon black | 2.0% |

In addition the additives mentioned in Example 1 can be incorporated.

The material was viscoelastic and had a dynamic elasticity modulus of from $10^7$ to $10^{10}$ Nm$^{-2}$ and a loss factor of at least 0.05. A vehicle having wheel housing parts formed from the material had reduced interior noise.

EXAMPLE 4

A polyurethane elastomer was produced from the following two-component materials:
Component A:
50 parts of a polyol with an OH number of 40 (Desmophen 3300)
50 parts of short-chained polyols with an OH number of 375 (Baytherm 4012R)
5 parts of a water-extracting agent (Baylith-Paste T)
40 parts chalk (amorphous)
2 parts DBZL.
 The OH number of the mixture was 207.
 Component B:
51 parts MDI (Desmodur 44V20).

The material was viscoelastic and had a dynamic elasticity modulus of from $10^7$ to $10^{10}$ Nm$^{-2}$ and a loss factor of at least 0.05. A vehicle having wheel housing parts formed from the material had reduced interior noise.

EXAMPLE 5

A polyurethane elastomer-based plastics material having the desired properties was produced from the following components:
Component A:
88 parts polyol with an OH number of 40 (Desmophen 3300)
12 parts butane 1,4-diol
30 parts heavy spar
10 parts chalk
10 parts talc
1 part DBZL
1.5 parts DABCO.
 The mixture had an OH number of 182.
Component B:
37 parts MDI/TDI (1:1) (Desmodur 44V20/T80).

With two-component polyurethanes, the characteristic number can, in practice, be clearly above or below 100.

The material was viscoelastic and had a dynamic elasticity modulus of from $10^7$ to $10^{10}$ Nm$^{-2}$ and a loss factor of at least 0.05. A vehicle having wheel housing parts formed from the material had reduced interior noise.

BRIEF DESCRIPTION OF THE SEVERAL VIEWS OF THE DRAWINGS

For a better understanding of the invention and to show how the same may be carried into effect, reference will now be made, by way of example, to the accompanying drawings, in which:

FIG. 4 shows a section through a portion of the wheel housing part of FIGS. 1 to 3 on an enlarged scale, FIG. 5 shows an enlargement of part V of FIG. 4.

DETAILED DESCRIPTION

Figure 1:
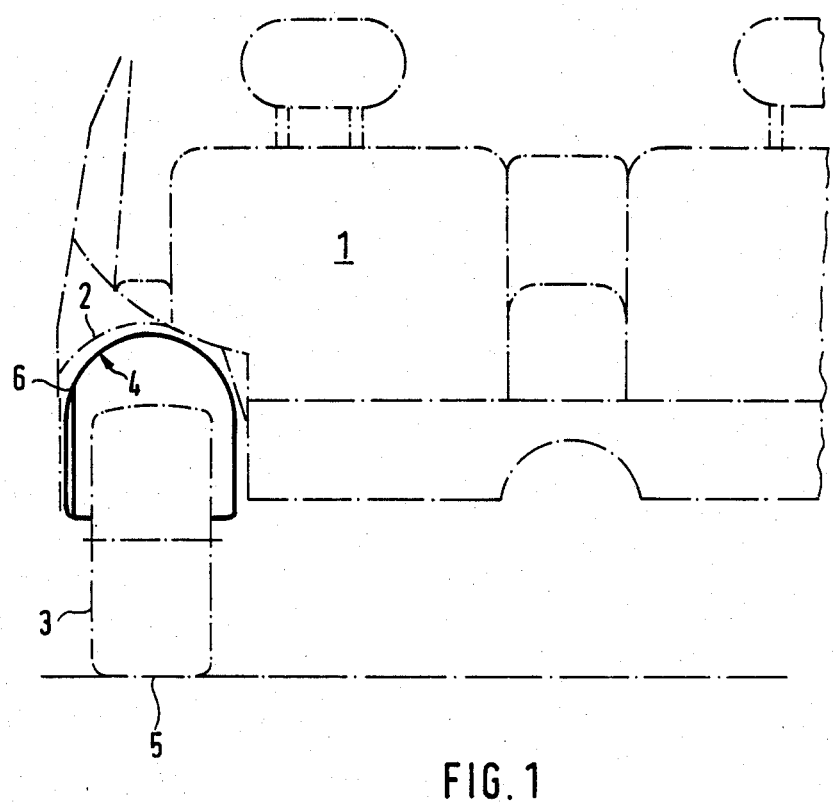
FIG. 1 is a schematic section of part of a motor vehicle having a wheel housing part provided in the wheel guard in accordance with the present invention.

Referring to FIG. 1 there is shown a motor vehicle 1 whose interior is to be protected from the outside with regard to the development of noise. The vehicle 1 has a wheel guard 2 in which a wheel 3 is arranged. In the wheel guard 2 there is provided a plastics wheel housing part 4. The wheel housing part 4 is secured to the wheel guard 2 or to its outwardly facing flange area 6. A wheel housing part of this kind has hitherto been used exclusively for avoiding damage caused by gravel and to protect against corrosion. By means of the present invention, for the first time a noticeable reduction in interior noise can be achieved, particularly when driving on wet roads, by the use of a special plastics material for the wheel housing part and optionally by means of suitable design and configuration.

Details have already been given about the special composition of the plastics material used for the wheel housing parts of the present invention. The particular design and construction will now be described by means of the Figures.

Figure 2:
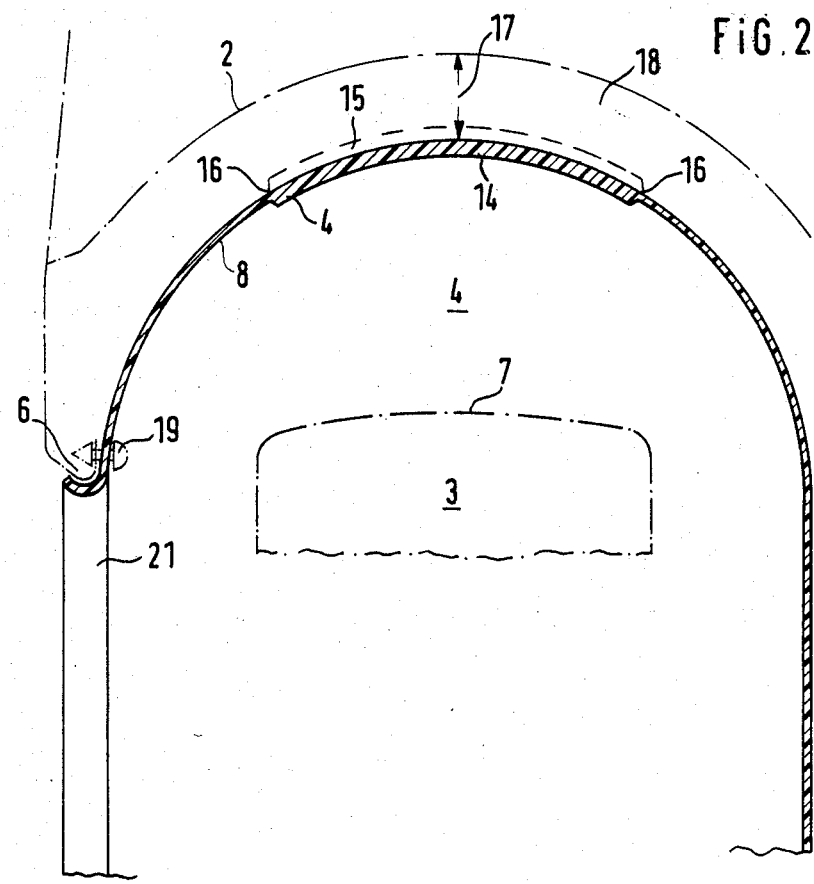
FIG. 2 is an enlargement of a part of FIG. 1 showing the arrangement of the wheel housing part on the wheel guard.

FIG. 2 shows an enlargement of the rear section of the wheel housing part 4 opposite the contact surface 7 of the wheel 3. According to this embodiment of the invention the surface 8 of the wheel housing part 4 facing the wheel 3 has a plurality of recesses. These are described in more detail by means of FIGS. 4 and 5. In addition roughenings (not shown) can be provided which preferably extend over the entire surface 8 of the wheel housing part 4 and which preferably have been provided artificially.

Whilst the roughenings can extend over the entire surface 8 of the wheel housing part 4, the recesses are preferably restricted to those zones of the wheel housing part 4 which in use receive that part of the water which has the higher impact energy. In particular, the rear section 9 (with respect to the travel direction denoted by arrow F) has recesses if necessary up to the location 10 opposite to the wheel contact point 5. These recesses are shown in detail in FIG. 4 and 5. There they are substantially spherical segment shaped recesses 13, and the edges 11 at their forward ends (with respect to the travel direction) are extended, whilst the edges 12 at their rearward ends are generally downwardly directed and flush with the surface 8 of the wheel housing part 4. A better water swirling affect is achieved by means of the raised edges 11 and turbulenced flows are produced when water is centrifuged according to the arrows W from the wheel 3 against the wheel housing part 4. On the other hand, when the vehicle is standing still, water collected in the recesses 13 drains away through the flush edges 12 more easily and drips from there to the ground.

Figure 3:
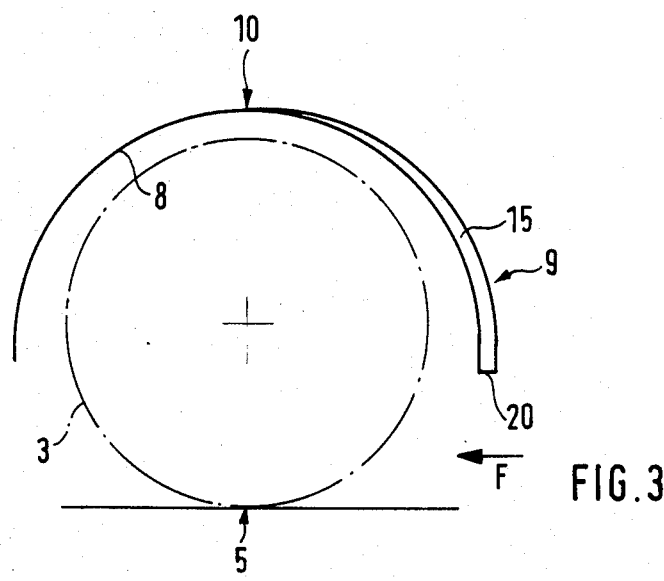
FIG. 3 is a section through the wheel housing part of FIGS. 1 and 2.

A further improvement is achieved by the wheel housing part having a thickening 14 in the region of the surface 8 facing the wheel or a thickening 15 on the surface of the wheel housing part 4 most remote from the wheel. This thickening 14 or 15 extends over a range which corresponds to the projection of the contact surface 7 of the wheel 3 and tapers at lateral edges 16. In side view this thickening 14 or 15 extends from the rear end 20 of the wheel housing part 4 in the travel direction (arrow F in FIG. 3) up to approximately the location 10 of the wheel housing part 4 which is in the middle opposite the wheel contact point 5. The thickness of the thickening 14 or 15 decreases continuously from the rear end 20. By means of this surface thickening 14 or 15 in those areas of the wheel housing part in which the greatest impact energy is to be expected, a changed impedance and a special spring effect is achieved which also has an energy-consuming effect as has aready been explained previously.

The special association of the wheel housing part 4 and the wheel guard 2 further encourages the reduction of interior noise in the vehicle 1. More particularly, a specific clearance 17 is provided between the wheel guard 2 and the wheel housing part 4 and the plastics material used has a specific surface mass. Through appropriate selection of these factors, a cavity resonator 18 is formed between the wheel guard 2 and the wheel housing part 4 which, by suitably selecting the clearance 17 and the surface mass, is adjusted to a quite specific frequency range and functions as a vibration absorber.

A flexible connection or coupling of the wheel housing part 4 with the wheel guard 2 or its flange area 6 also adds to an improvement of the acoustic behaviour. This can be achieved, for example, by clipping the edge 21 of the wheel housing part 4 around the flange area 6. This can be achieved additionally by, or only by, using special securing elements 19, such as catching plastic pins, as is usual for securing wheel housing parts 4 to wheel guards 2.

Figure 6:
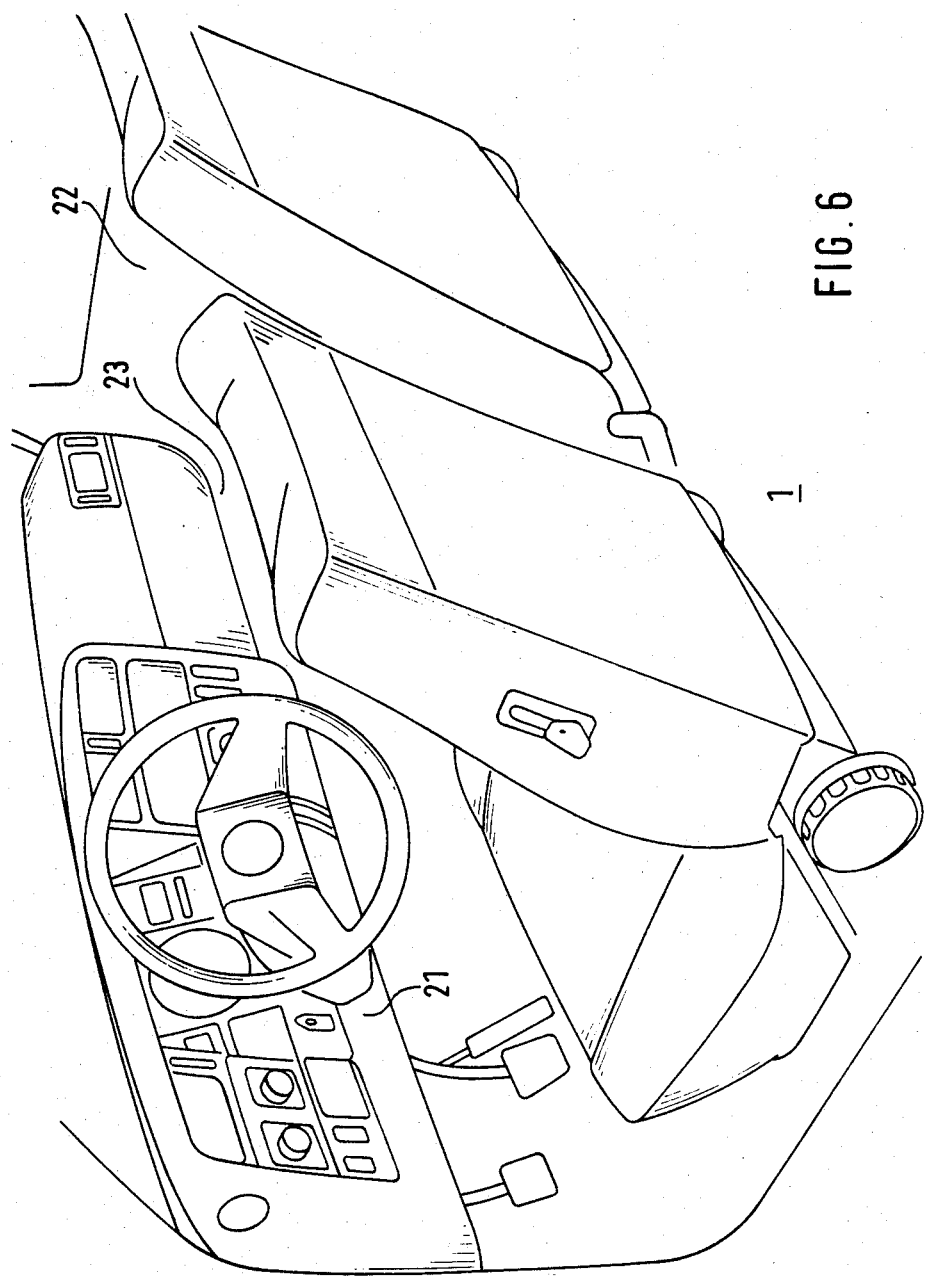
FIG. 6 shows a vehicle interior incorporating panels formed from plastics material in accordance with the present invention.

FIG. 6 shows the use of the viscoelastic plastics material having a dynamic elasticity modulus of $10^7$ to $10^{10}$ $Nm^{-2}$ and a loss factor of at least 0.05, as defined in the present application, for parts in vehicle interiors. These parts can be, for example, an instrument panel 21, a door panel 22, and/or internal wheel housing parts 23, as indicated in FIG. 6. The plastics material can also be used for other interior parts.

We claim:

1. A wheel housing part for securing inside a wheel guard of a motor vehicle, said part being formed from a viscoelastic material comprised of a plastic, a rubber, and a filler, such that said viscoelastic material has a dynamic elasticity modulus of $10^7$ to $10^{10}$ $Nm^{-2}$ and a loss factor of at least 0.05, wherein the viscoelastic material is formed from an intimate mixture from 25 to 40% by weight of an olefin polymer having high impact resistance; from 25 to 40% by weight of a synthetic rubber; and from 25 to 40% by weight of amorphous chalk.

2. A wheel housing part for securing inside a wheel guard of a motor vehicle, said part being formed from a viscoelastic material comprised of a plastic, a rubber, and a filler, such that said viscoelastic material has a dynamic elasticity modulus of $10^7$ to $10^{10}$ $Nm^{-2}$ and a loss factor of at least 0.05, wherein the viscoelastic material is formed from an intimate mixture of from 25 to 40% by weight of a polymer comprising said plastic and selected from the group consisting of olefin polymers having high impact resistance, styrene polymers having high impact resistance, and mixtures thereof; from 25 to 40% by weight of a synthetic rubber; and from 25 to 40% by weight of an amorphous filler, wherein the olefin polymer is polypropylene of high impact resistance, the synthetic rubber is an unsaturated ethylene-propylene-diene-rubber (EPDM), and the filler is selected from the group consisting of amorphous silicon dioxide and amorphous chalk.

3. A wheel housing part according to claim 1, wherein said synthetic rubber is a styrene-butadiene-rubber (SBR).

4. A wheel housing part according to claim 2, wherein said styrene polymer is selected from the group consisting of polystyrene and styrene copolymers having high impact resistance.

* * * * *